No. 702,401. Patented June 17, 1902.
E. L. CARAWAY.
SEED PLANTER.
(Application filed Sept. 20, 1901.)
(No Model.) 3 Sheets—Sheet 3.
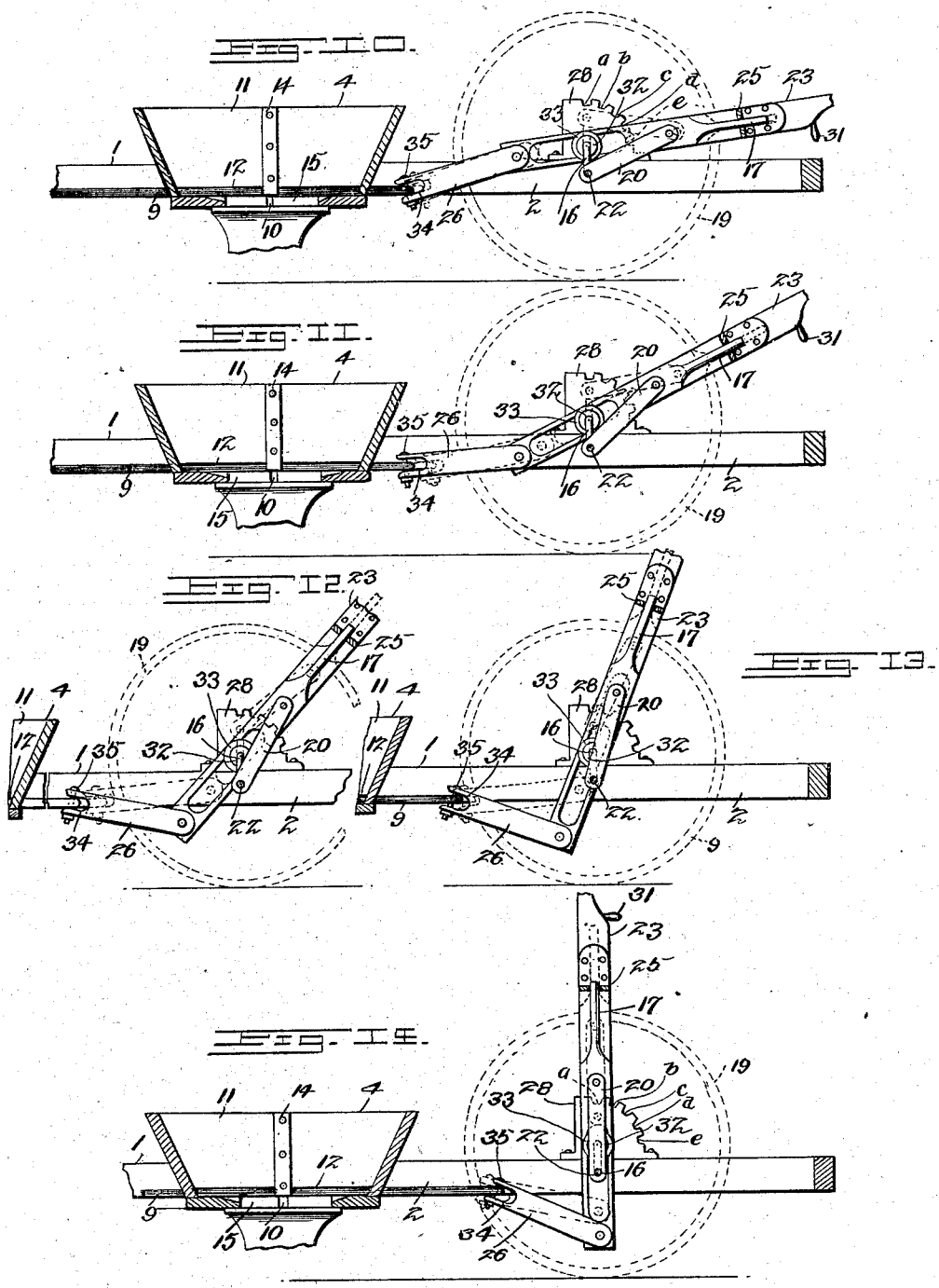
Witnesses
F. E. Alden.
R. M. Elliott.
E. L. Caraway, Inventor.
by C. A. Snow & Co.
Attorneys

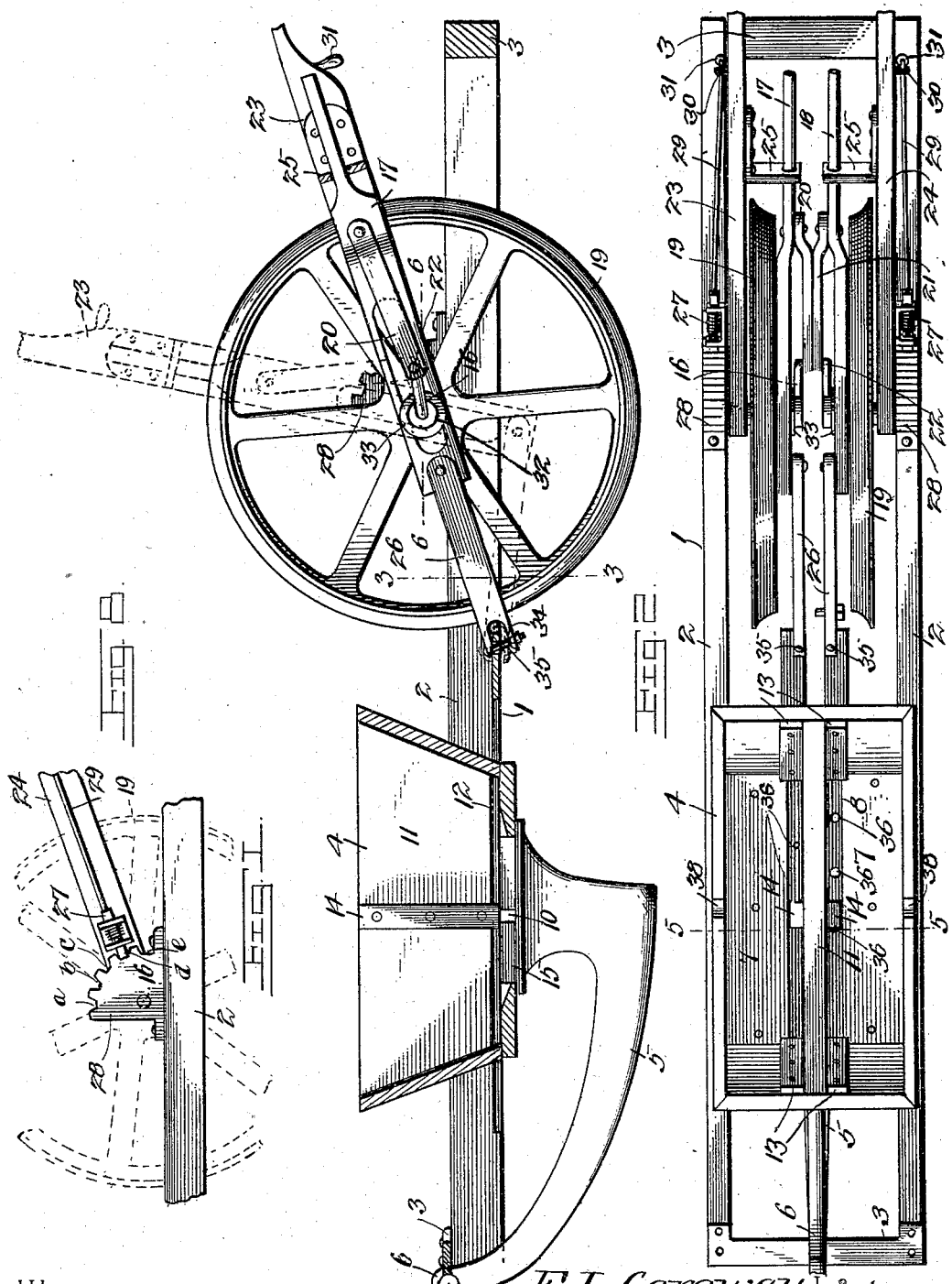

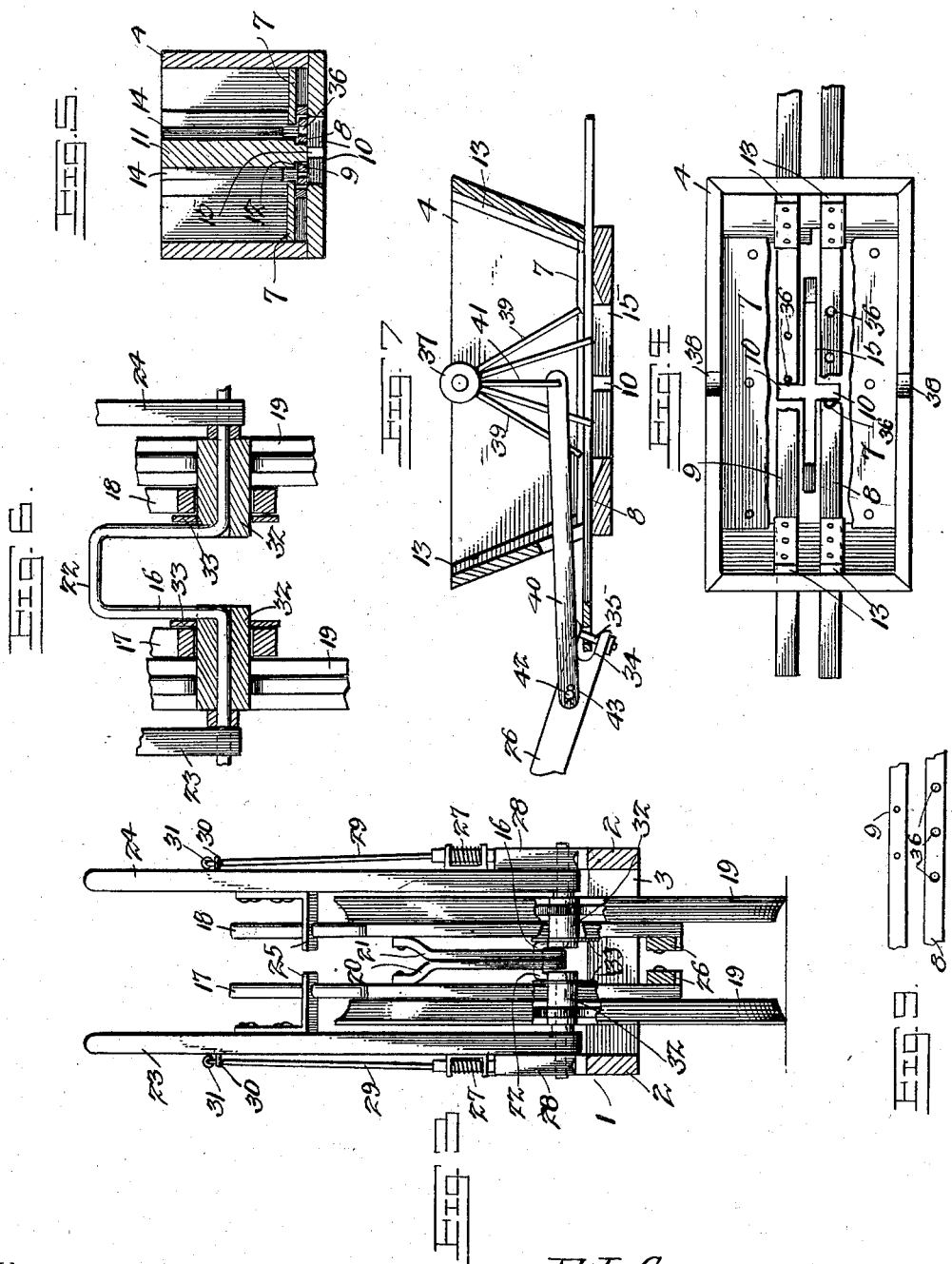

UNITED STATES PATENT OFFICE.

EMMETT L. CARAWAY, OF PIGGOTT, ARKANSAS.

SEED-PLANTER.

SPECIFICATION forming part of Letters Patent No. 702,401, dated June 17, 1902.

Application filed September 20, 1901. Serial No. 75,880. (No model.)

*To all whom it may concern:*

Be it known that I, EMMETT L. CARAWAY, a citizen of the United States, residing at Piggott, in the county of Clay and State of Arkansas, have invented a new and useful Seed-Planter, of which the following is a specification.

This invention relates to seed-planters.

The object of the invention is to provide simple and effective means for controlling the feed of the seed by which the width of the spaces between the seeds in the rows may be changed at will to effect close or wide planting thereof and for permitting planting of two different kinds of seed at the same time and at the same or different distances apart or for permitting seed and fertilizer being dropped together.

A further object is to provide means by which without stopping the operation of the machine the feed of seed may be increased or diminished as to quantity and as to distance apart, and where planting two kinds of seed one of which is not adaptable to the land traversed by the machine the dropping of this latter kind of seed may be checked without interfering with the dropping of the other.

With these and other objects in view, as will appear as the nature of the invention is better understood, the same consists in the novel construction and combination of parts of a seed-planter, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the scope of the invention, and in these drawings—

Figure 1 is a view in side elevation, partly in section. Fig. 2 is a view in top plan. Fig. 3 is a view in transverse section taken on the line 3 3, Fig. 1. Fig. 4 is a view in top plan of the seed-hopper, the partition shown in Figs. 1 and 2 being omitted. Fig. 5 is a transverse sectional view through the hopper, taken on the line 5 5, Fig. 2. Fig. 6 is a transverse sectional view taken on the line 6 6, Fig. 1, showing more particularly the construction of the crank-shaft, certain parts not necessary to be shown being omitted. Fig. 7 is a sectional detail view of the seed-hopper, showing the same equipped with an agitator to be employed when the machine is used for planting cotton-seed. Fig. 8 is a fragmentary detail view of one of the rack-plates for holding the seed-plate-actuating mechanism at the desired adjustment. Fig. 9 is a detail view in plan of the seed-plates. Figs. 10, 11, 12, 13, and 14 are views in side elevation, showing the different adjustments of the seed-plate reciprocatory mechanism from the position where the greatest throw is imparted to the seed-plate to the position where there is no throw imparted thereto.

Referring to the drawings, 1 designates the supporting-frame, the same comprising side and end beams 2 and 3, suitably held assembled to present a rigid structure. Supported near the forward end of the frame is the seed-hopper 4, communicating with the under side of which is an ordinary sword furrow-opener 5, suitably secured to the front cross-beam and having associated therewith a clevis 6. While a sword-opener is herein shown as associated with the seed-hopper it is to be understood that the invention is not to be limited to this particular form of opener, as any other style may be employed and still be within the scope of the invention. Secured in the bottom of the seed-hopper are two guides 7, against which work two seed-plates 8 and 9, respectively, the said plates being held in proper position over the seed-escape openings 10 (clearly shown in Fig. 4) by a removable partition 11, the lower edge of which is incut, as at 12, to form overhanging flanges to hold the seed-plates against lifting. The partition is held suitably assembled with the hopper by cleats 13, secured to the inner side of the ends of the hopper. The partition carries two brushes or cut-offs 14, which operate in a well-known manner to prevent clogging of seed in the opening of the seed-plate and also to control the number of seed dropped. Communicating with the seed-escape openings 10 is a longitudinal slot 15, through which cotton-seed escape when the machine is used as a cotton-seed planter, the mechanism for feeding the cotton-seed through the slot 15 being hereinafter fully described.

The mechanism for actuating the seed-plates and which constitutes the essential feature of this invention comprises, generally stated, means for imparting differential rates of reciprocation to the seed-plates, and consists of a crank-shaft 16, a pair of longitudinally-slotted slide-rods 17 and 18, respectively mounted on the shaft-terminals inside of the supporting-wheels 19, a pair of pitman-rods 20 and 21, mounted on the crank 22 of the shaft and pivotally connected to the slide-rods at a point near their upper terminals, slide-rod-shifting means comprising two rock-levers 23 and 24, respectively, carrrying guides 25, through which the reduced upper terminals of the slide-rods project and work, and pivoted links 26, connecting the lower extremities of the slide-rods and the seed-plates. Each of these mechanisms is a counterpart of the other and works independently thereof, by which arrangement, as will appear later on, one of the seed-plates may be made to feed rapidly and the other slowly, or both feed at the same rate of speed, or one feed and the other remain idle. Each of the rock-levers carries a spring-pressed locking-latch 27 of the ordinary or any preferred construction which is designed to engage teeth or notches in a quadrant rack-plate 28, secured to the side beams 1, these rack-plates being provided with bearings for the terminals of the crank-shaft 16, as clearly shown in Fig. 3. Each locking-latch has connected with it a rod or wire 29, the upper portion of each of which works in a guide or keeper 30, carried by the rock-lever, and is provided with an operating-handle 31, by which the latch may be thrown out of engagement with the rack-plate when desired.

Each of the supporting-wheels 19 is provided with a hub 32, in which the straight terminal of the shaft 16 is secured, as clearly shown in Fig. 6, on which work the slotted portions of the slide-rods 17 and 18, a washer 33, mounted on the hub between the rods and the crank-shaft 16, serving to prevent the said rods from contact with the said shaft.

As herein shown, each rack-plate 28 is provided with five teeth or notches, this number being found sufficient in effecting the different adjustments of the seed-plates; but it is to be understood that this number may be increased, if found desirable or necessary. As before stated, the mechanism just described is designed to impart differential rates of reciprocation to the seed-plates—that is to say, a long or a short reciprocation, according to the quantity of seed it is desired to drop and the distance apart at which they are planted. When the rock-levers are in an approximately vertical position, with the locking-latches in the notches $a$ of the rack-plates, turning of the crank-shaft merely operates to cause the slide-rods 17 and 18 to move vertically, and thus no reciprocatory motion is imparted to the seed-plates. Upon a rock-lever being moved to bring its locking-latch into engagement with the notch $b$ of the latch-plate, the slide-rod associated with that lever will be thrown toward the rear of the machine, whereupon a slight reciprocatory movement will be imparted to the seed-plate connected therewith, the degree of reciprocation being progressively increased as the locking-latch is moved into engagement with the successive notches $c$, $d$, and $e$. When the locking-latch is in the notch $e$, the slide-rod will occupy approximately the position shown by full lines in Fig. 1, and will thus impart a throw to the seed-plate equal to the throw of the crank 22, while when in the position shown in dotted lines in the same figure and as before pointed out no motion will be imparted to the seed-plate. In other words, the reciprocation of the seed-plate progressively increases as the slide-rod approaches a horizontal position and progressively decreases as the slide-rod approaches a vertical position. In order to permit the slide-rod to move up and down without straining the seed-plate when the rock-lever is in an approximately vertical position, the end of the link that connects with the seed-plate is bifurcated to present a yoke 34, through which passes a bolt 35, that serves to hold the seed-plate in operative connection therewith. This form of connection between the link and the seed-plate will be found thoroughly effective in use, and by reason of its simplicity of construction will generally be employed; but it is to be understood that other means for connecting these parts may be employed—such as a universal or knuckle joint—and as this will be readily understood illustration is deemed unnecessary.

It will be observed by reference to Fig. 2 that the seed-escape openings 36 in the seed-plates are of much greater diameter in the plate 8 than in the plate 9, this arrangement being adopted in order to permit the dropping of two different kinds of seed at one time—as, for instance, corn and peas or corn and pumpkin—it being obvious that if the openings in the plate were of the same size a greater number of the smaller seed would escape in proportion to the escape of the larger seed than would be desirable.

The diameter of the supporting-wheels with relation to the parts which they operate is to be such that when the locking-latch is in the notch $e$ the distance between the dropped seeds will be about fifteen inches, or four times to each revolution of the wheel; if in notch $d$, about twenty inches apart, or three times to each revolution of the wheel; if in notch $c$, about thirty inches apart, or twice to each revolution of the wheel; if in notch $b$, about sixty inches apart, or once to each revolution of the wheel, and if in notch $a$, no feeding will be effected, as before pointed out.

To illustrate the foregoing, it will be supposed that it is desired to plant corn and peas at the same time. The corn is placed in the hopper and the chamber containing the seed-plate 9 and the peas in the chamber containing the seed-plate 8, it being observed that the seed-escape openings in the plate 8 are of much greater diameter than those of the plate 9 to permit dropping of a greater number of peas than of corn. The two rock-levers will now be moved to bring the latches into engagement with the notches $e$, and as the machine is drawn over the ground corn will be dropped one grain to the hill at fifteen inches apart, and peas, say, six or eight at a time, to the hill at the same distance apart, not in the same hill with the corn, but alternating therewith at about seven and one-half inches from corn to peas. If the rock-levers are moved to bring the latches into engagement with the notches $d$, the corn will be dropped in the hills at about twenty inches apart and the peas at about the same distance, alternating ten inches from corn to peas, and so on, progressively increasing in the ratio stated up to the notch $b$. Should it be desired to plant a greater number of hills of peas than of corn or a greater number of hills of corn than of peas, this may be effected in the first instance by moving the latch of the rock-lever 17, say, into notch $b$ and the latch of rock-lever 18 into notch $e$, whereupon it will be seen that three hills of peas will be planted to one hill of corn, and by reversing the positions of the levers a greater number of hills of corn will be planted than of peas. In fact, by adjusting the rock-levers to different notches in the rack-plate the change in dropping of different seeds may be almost indefinitely varied. Should the machine be drawn over a stretch of field that is too poor to grow corn, the dropping of the corn may be cut off and the planting of the peas continued. If desired, the corn may be placed in the chamber occupied by the peas and the peas placed in the chamber occupied by the corn, and under these conditions two grains of corn will be dropped to each hill and a fewer number of peas deposited. In the same manner corn and pumpkin-seed may be dropped together at the desired distance apart, or corn and beans, and these seeds may be evenly or unevenly spaced apart by adjusting the rock-levers in the manner already described. In planting sorghum-seed or broom-corn seed these are generally planted very thick, and to effect this the seed is placed on both sides of the partition 11 and the rock-levers set with the locking-latch of both levers in the notch $e$, whereupon dropping of the seeds will be effected at seven and one-half inches apart, and so on, as may be desired.

Under the operation of the machine, as described, the planting of two different kinds of seed is effected at the same time, but not in the same hill—that is to say, the different kinds of seed alternate, say one of corn and one of peas; but should it be desired to drop two different kinds of seed in the same hill this is effected by detaching the seed-plate 9 from its link and turning it end for end, thereby bringing two of the seed-escape openings in the plate 9 exactly opposite the two escape-openings in the plate 8, it being understood that the latter plate has only two escape-openings, while the former has three. By this arrangement one of the escape-openings in the plate 9 is cut out of operation, while the other two openings feed at the same time as the openings in the plate 8, whereby dropping at fifteen inches apart and up to sixty inches is effected. When thus dropping two different kinds of seed together, the seed-plates may be so adjusted to make one, two, three, or four hills of one kind of seed to one kind of another—that is to say, in planting beans and corn together in the same hill there may be an interval of two or three hills between those containing corn and beans, the intervening hills being only corn. When the machine is thus adjusted, it may be used as a corn-planter alone, in which case three grains of corn will be dropped in each hill, two by the plate 8 and one by the plate 9, or by cutting off the seed-plate 9 only two grains of corn will be dropped, or by cutting off plate 8 and operating plate 9 only one grain of corn will be dropped.

When the device is used as a cotton-seed planter, the partition 11 is removed, and an agitator or stirrer is associated with the hopper, the same comprising a shaft 37, adapted to engage bearings 38, formed in the upper edges of the sides of the hopper. The shaft carries a plurality of divergent fingers 39, which are designed to work in the slot 15 in the bottom of the hopper, motion being imparted to the agitator through a rod 40, one end of which is pivotally connected with an arm 41, carried by the shaft 37, and the other end with a wrist-pin 42, carried by one of the links 26, a cotter-pin 43 passing transversely through the wrist-pin, serving to hold the rod 40 associated therewith. Under the operation of the machine swinging motion is imparted to the agitator, which operates to stir up and feed the seed out through the slot 15, the seed-plates also assisting in preventing the seed from clogging in the hopper. If desired, one of the seed-plates may be cut out of operation; but the other one will of course have to run. By adjusting the rock-lever connected with the seed-plate to the link to which the rod 40 is connected the feed of the cotton-seed may be regulated in the same manner as when planting corn or other seed.

It is to be understood that fertilizer may be dropped at the same time with the corn by placing the corn on one side of the partition and the fertilizer on the other.

It will be seen from the foregoing description that the seed-hopper of this invention provides for practically every contingency that might arise in effecting proper planting of seed of any character and that the parts are of such simple construction and are so assembled as to reduce liability of damage in use to a minimum. Moreover, should a part become broken it may be readily replaced by a mechanic of ordinary ability, thereby avoiding loss of time which would result were the parts of such construction as to require particular machinery in their manufacture.

Having thus fully described the invention, what I claim as new, and desire to secure by Letters Patent, is—

1. In a seed-planter, the combination with a seed-plate, of operating mechanism adjustable to effect differential movements of the said plate.

2. In a seed-planter, the combination with the seed-plate, of reciprocatory mechanism adjustable to effect differential movements of the said plate.

3. In a seed-planter, the combination with the seed-plate, of reciprocatory mechanism adjustable from an approximately vertical to an approximately horizontal plane, whereby to increase or decrease the throw of the said plate in accordance with the work to be done.

4. In a seed-planter, means for imparting differential rates of movement to the seed-plate, comprising a motion-imparting member, a reciprocatory member associated therewith, a vibratory member operatively connected with the motion-imparting member and the reciprocatory member, means for changing the working planes of the latter member thereby to vary the throw of the vibratory member, and connections between the reciprocatory member and the seed-plate.

5. In a seed-planter employing two seed-plates, means for imparting like or differential rates of reciprocation to the plates, comprising a crank-shaft, slide-rods mounted on the terminals thereof, pitman-rods mounted on the crank and connecting with the slide-rods intermediate of their ends, slide-rod-shifting means, and connections between the slide-rods and the seed-plates.

6. In a seed-planter, a seed-hopper, seed-plates arranged therein and having seed-escape openings of different sizes, and reciprocatory mechanism connected with the said plates and adjustable to effect differential movements thereof.

7. In a seed-planter, a frame supporting a seed-hopper, a crank-shaft journaled in suitable bearings on the frame and carrying the frame-supporting wheels, slide-rods mounted on the terminals of the shaft, pitman-rods mounted on the crank and connecting with the rods intermediate of their ends, seed-plates carried by the hopper, connections between the seed-plates and the slide-rods, and rock-levers carrying guides engaged by the upper terminals of the slide-rods and provided with means whereby the said slide-rods may be locked at any desired adjustment.

8. In a seed-planter, two seed-plates, in combination with means for imparting like or differential rates of reciprocation thereto.

9. In a seed-planter, two seed-plates having different-sized seed-escape openings, in combination with means for imparting like or differential rates of reciprocation to the said plates.

10. In a seed-planter, a rock-lever movable about a fixed axis and including locking mechanism, a slide-rod carried by the lever, a seed-plate, means for pivotally connecting the slide-rod and the seed-plate, and means for imparting a reciprocatory motion to the slide-rod.

In testimony that I claim the foregoing as my own I have hereto affixed my signature in the presence of two witnesses.

EMMETT L. CARAWAY.

Witnesses:
ANDERSON WILLIAMS,
I. C. LANGLEY.